United States Patent [19]

Matthew

[11] 4,416,402
[45] Nov. 22, 1983

[54] SPARE TIRE MOUNT FOR PICKUP TRUCK
[75] Inventor: Lee M. Matthew, Frederick, Okla.
[73] Assignee: James Elton Matthew, Burkburnett, Tex.
[21] Appl. No.: 459,277
[22] Filed: Jan. 19, 1983
[51] Int. Cl.³ ............................................. B60R 9/02
[52] U.S. Cl. .............................. 224/42.24; 224/42.25; 414/463
[58] Field of Search ............... 224/42.24, 42.25, 42.12; 414/463

[56] References Cited
U.S. PATENT DOCUMENTS

| | | | |
|---|---|---|---|
| 2,772,826 | 12/1956 | Krengel | 224/42.24 |
| 3,204,840 | 9/1965 | Bowen | 224/42.24 |
| 3,613,972 | 10/1971 | Daughetee | 224/42.24 |
| 4,007,863 | 2/1977 | Norris | 224/42.24 |
| 4,013,203 | 3/1977 | McCauley | 224/42.24 |
| 4,089,449 | 5/1978 | Bayne et al. | 224/42.24 |
| 4,366,923 | 1/1983 | Koch | 224/42.24 |

Primary Examiner—Steven M. Pollard
Attorney, Agent, or Firm—Drude Faulconer

[57] ABSTRACT

An adjustable, spare tire mount for a pickup truck that can be quickly installed and removed without requiring either welding or the drilling of holes in the pickup bed. The mount is comprised of a main support structure which carries a latching element which, in turn, has a channel member thereon adapted to receive a flange on the inside of the upper sidewall of the load bed of the pickup. A threaded follower assembly on the main structure cooperates with the latching element to move the channel member into or out of contact with the flange to latch or unlatch the mount to the bed. Slidably mounted on the main support means is the tire securing means which comprises a movable carriage having an adjustable tire mounting means (e.g. telescoping members) mounted thereon. Once the spare tire is positioned on the tire mounting means, a sleeve is positioned thereon and secured thereto by a pin and lock. When the tire is locked on the mount, the threaded follower is obscured and cannot be unthreaded, thereby providing security for the mount and tire.

10 Claims, 4 Drawing Figures

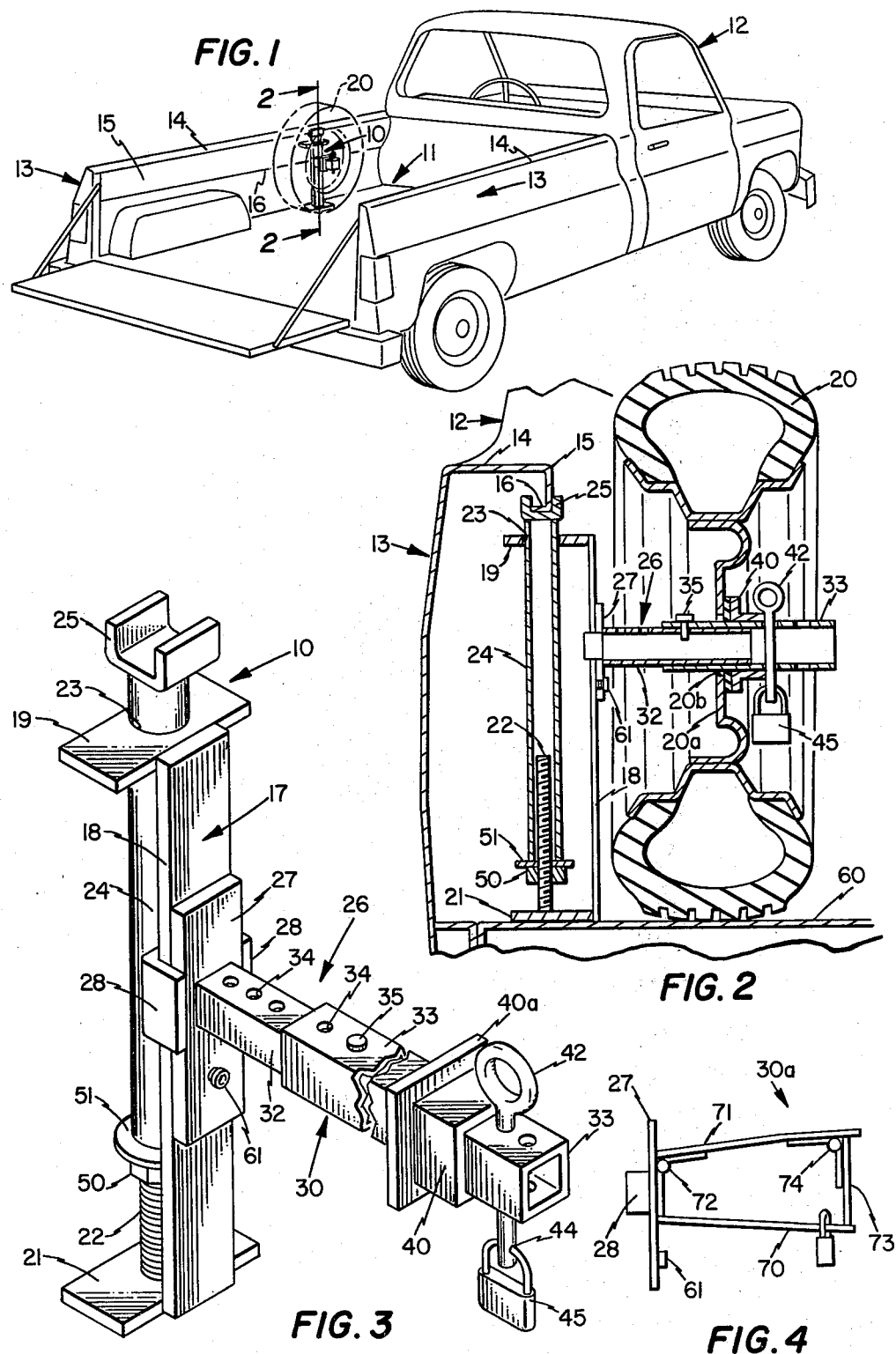

SPARE TIRE MOUNT FOR PICKUP TRUCK

BACKGROUND OF THE INVENTION

The present invention relates to a spare tire mount and more particularly relates to an easily removable, secure structure for mounting a spare tire in the bed of a pickup.

The spare tire on most pickup trucks are carried on a support which is located underneath the rear portion of the load bed of the truck. As anyone knows who has had to change a tire on such trucks, this positioning of the spare tire is less than desirable. For example, it is almost impossible to remove the spare without sitting, kneeling or otherwise coming in contact with the ground. In addition to the other discomforts involved, this procedure almost always leads to the soiling of the operator's clothing, especially when the ground is muddy, as is often the case.

Further, the spare tire and its mount are continuously exposed to rain, snow, slush, mud, etc., which splash upward from the ground to accumulate on the tire and its mount thereby further complicating the removal of the spare when needed.

To overcome these apparent undesirable features, several substitute mounting structures have been designed for such pickup trucks wherein the spare tire is mounted in a readily accessible position either outside or inside the load bed of the pickup. Known structures which mount the spare tire outside of the bed are relatively expensive to install and must be permanently attached to the pickup truck by welding, bolts, screws, or the like.

Likewise, most known structures which mount the spare tire inside the pickup bed (e.g. see U.S. Pat. Nos. 4,013,203 and 4,089,449), are also designed to be bolted or welded to the wall structure of the pickup bed. By so attaching these structures, several disadvantages arise. For example, if welding is used, the mount is permanently in place and cannot be removed practically if a situation arises where the entire capacity of the pickup bed is needed to haul a particular cargo.

On the other hand, if bolts are used to attach the mount, holes must be drilled into the pickup bed which become susceptible to rust or the like when explosed to the elements. Still further, when an owner sells or trades his truck and wishes to transfer his spare tire mount, the remaining holes or previously welded areas may seriously detract from the resale value of the truck.

Therefore, a need exists for a spare tire mount which can easily be installed and quickly removed from the bed of a pickup truck and one which requires no welding or the drilling of holes in the bed of the truck. One such mount is that shown in U.S. Pat. No. 4,007,863. While this mount meets the above described criteria for quick removal, it is believed that this mount nevertheless has some serious drawbacks from a security aspect. That is, even though the spare tire is adequately locked onto the disclosed mounting structure, the threaded feet which secure the mount in place in the pickup bed are readily accessible to a thief and can easily be unthreaded to permit removal of both the spare tire and the mount as an integral unit.

Also, since both the diameter and width of the spare tire, from time to time or from truck to truck, may vary due to the many sizes of tires now available, it is further desirable for the mount to be capable of easily being adjustable to compensate for these different tires in order that a single, commercially supplied mount may be used on a wide variety of pickup models.

SUMMARY OF THE INVENTION

The present invention provides a mount for a spare tire inside the bed of most commercially available pickup trucks which is quickly installed and removed without requiring either welding or the drilling of holes in the pickup bed. Further, once in place with the spare tire securely locked thereon, as a practical matter, the mount cannot be removed from the pickup bed. Still further, the present mounting structure is adjustable so that spare tires of different diameters and of different widths can be mounted thereon.

More specifically, the mounting structure of the present invention is comprised of a main support structure that has a latching element with a channel member thereon which, in turn, is adapted to receive a flange on the inside of the sidewall of the load bed of the pickup. The main support member also includes a threaded member, and by merely turning a follower assembly (e.g. nut and washer), threaded thereon, the channel member of the latching element moves upward into contact with the flange, thereby latching the main support means in a vertical position within the pickup bed.

Slidably mounted on the main support member is a tire securing means. This means is comprised of a carriage which can move upward or downward along the entire length of the main support member to any desired vertical position where it can be locked on the main support by means of a set screw. This allows the mount to be adjusted according to the diameter of the particular spare tire to be mounted. Secured to the carriage is the tire support means which preferably comprises two, telescoping sections which can be adjusted to provide the length necessary to support a tire of a particular width.

Once the main support is latched in place and a spare tire is positioned on the tire support means, a sleeve is slipped over the outer telescoping section to hold the tire in place on the mounting structure. The sleeve is held in place by a pin which passes through an opening in the outer section, said pin having an opening therethrough adapted to receive a keyed or combination lock to prevent the unauthorized removal of the pin, and hence the spare. Further, with the spare tire locked in place, the follower assembly which effects the locking function for the main support member is effectively obscured and cannot be rotated, thereby making removal of the mount and the mounted spare tire practically impossible without special tools, e.g. cutting torch or the like.

The mounting structure of the present invention can be quickly installed by a buyer with only a standard wrench and can be as quickly removed in the event that the total bed capacity of the truck is subsequently needed. Further, the owner may easily transfer this mount to another pickup if the need arises (e.g. purchase of a new pickup), with the added benefit that there will be no unwanted holes, welded areas, etc. remaining in the pickup bed from which it was removed. Further, for cosmetic reasons, the present mount may easily be painted the same color as the pickup on which it is to be used and can be repainted if transferred, thereby providing an owner long service from a single mount.

BRIEF DESCRIPTION OF THE DRAWINGS

The actual construction, operation and apparent advantages of the present invention will be better understood by referring to the drawings in which like numerals identify like parts and in which:

FIG. 1 is a perspective view of a typical pickup truck with the spare tire mount of the present invention in an operable position;

FIG. 2 is a sectional view taken along line 2—2 of FIG. 1;

FIG. 3 is a perspective view of the present invention; and

FIG. 4 is a partial, side view of another embodiment of the present invention.

DESCRIPTION OF THE PREFERRED EMBODIMENTS

Referring more particularly to the drawings, FIG. 1 discloses the spare tire mount 10 of the present invention in an operable position within load bed 11 of a typical pickup truck 12. As should be understood, truck 12, as illustrated, is representative of many different makes and models of pickups that are currently available. Almost all of such trucks have sidewalls 13 (FIGS. 1 and 2), the upper part of which are formed of a top portion 14, a downturned portion 15, and an inturned portion 16; the latter of which will be hereinafter referred to as flange 16.

Turning now to FIGS. 2 and 3, spare tire mount 10 is comprised of main support structure 17 which serves to lock mount 10 in position within bed 11 of truck 12. Main support structure 17 is comprised of elongated support member 18 having an upper plate 19 and a lower plate 21 welded or otherwise secured at either end thereof.

Threaded member 22 is secured by welding or the like to the upper side of lower plate 21 and extends upward therefrom. Follower assembly (e.g. nut 50 and washer 51) is threaded onto threaded member 22. Upper plate 19 has an opening 23 therethrough of a diameter large enough to allow tubular latching element 24 to move easily therethrough. Affixed to the top of latching element 24 by welding or the like is element 25 which has a U-shaped channel therein.

Slidably mounted on support member 18 is tire securing means 26. Means 26 is comprised of a carriage having a base plate 27 which is slidably mounted on support member 18 by a pair of L-shaped channel members 28 that have one leg thereof welded or otherwise secured to either side of said base plate 27. Adjustable tire mounting means 30 is mounted on base plate 27 and is comprised of telescoping sectional members 32, 33. Both sectional members 32,33 have a series of spaced openings therethrough which can be alternately aligned to provide a desired length for means 30. Sectional members 32,33 will be maintained in their desired relative positions by means of pin 35 or the like. The cross-sectional dimensions of members 32,33 are not critical as long as those of outer section 33 are such that it will easily pass through the center opening 20b (FIG. 2) in wheel 20a on which spare tire 20 is mounted. Sleeve 40 is adapted to slide over sectional member 33 and to be retained thereon by a second pin 42 or the like. Pin 42 has an opening 44 through the lower portion thereof which is adapted to receive lock 45. To further understand the details of the construction and operation, the following example is set forth, but it should be recognized that certain shapes, dimensions and materials may vary without departing from the present invention.

Support member 18 is formed of a 16 inch length of 2 inch wide, $\frac{3}{4}$ inch thick steel strip stock. A 4 inch length of the same steel strip stock is used for both upper plate 19 and lower plate 21. Opening 23, having a diameter of approximately 1$\frac{1}{4}$ inch is formed in upper plate 19. A 6 inch length of $\frac{1}{2}$ inch diameter threaded bolt member forms threaded member 22 and is welded to lower plate 21. Nut 50 is threaded onto member 22 and a washer having a 1 to 1$\frac{1}{2}$ inch O.D. is positioned onto nut 50.

Tubular element 24 is formed of a 14 to 15 inch length of 1 inch O.D. steel pipe and has a 1 to 2 inch long piece of a U-shaped channel iron welded to one end thereof. Pipe 24 is lowered through opening 23 in top plate 19 and down over threaded member 22 until the lower edge thereof rests on washer 51 which, in turn, is supported by nut 50.

Base plate 27 is formed of a 4 to 6 inch length of 2 inch wide, $\frac{3}{4}$ inch thick steel strip stock and has a 2 inch long, $\frac{3}{4}$ inch thick L-shaped channel iron member 28 welded to either side thereof. Preferably, sectional members 32, 33 are made of appropriate sized steel square tubing, each of a length of 3 to 4 inches long, with one end of inner member 32 being welded to base plate 27. Sleeve 40 is also made of steel square tubing 1 to 1$\frac{1}{2}$ inches long and of a size sufficient to easily slip onto section 33. Sleeve 40 preferably has a flanged portion 40a thereon but this may not be necessary if the cross-sectional dimensions (i.e. sides) of section 33 is approximately the same as the diameter of the center opening 20b in wheel 20a.

To assemble tire securing means 26 onto main support 17, it will be understood that channel irons 28 will be slipped onto support member 18 before top plate 19 is welded thereto or, alternatively, at least one channel iron 28 will be welded to base element 27 while means 26 is being held in place on member 18. Once assembled, means 26 is free to move up and down on member 18 but cannot be removed therefrom due to the upper and lower plates.

In operation, nut 50 is threaded downward on member 22 so that channel element 25 will clear flange 16 of the pickup bed 11 when mount 10 is vertically positioned thereunder. Nut 50 is then threaded upward on member 22 so that washer 51 raises member 24 upward to a position wherein flange 16 will be fully received in channel 25 as shown in FIG. 2. Nut 50 is tightened to securely wedge mount 10 in a fixed and latched position within bed 11.

Next, tire securing means 26 is positioned so tire mount element 30 will be at a level where it will extend through the center opening 20b of wheel 20a when tire 20 is in a vertical position and resting on floor 60 of bed 11. Set screw 61 (FIGS. 2 and 3) in base plate 27 is tightened to fix securing means 26 at the desired vertical location on support member 18. Next, sectional members 32 and 33 are adjusted to the length required for the width of the tire to be mounted and are then secured together at this length by pin 35. Wheel 20a with tire 20 thereon is positioned onto tire mount element 30 and pushed backward thereon as far as it will go. Note that the weight of tire 20 is primarily supported by floor 60 of bed 11 and that very little weight will be on mount element 30. Sleeve 40 is then slipped over member 33 and is secured thereon by pin 42 and lock 45.

If the alignment of the holes 34 in member 33 and the forward edge of sleeve 40 is such that there is undesirable "play" of tire 20 on mount 10 when pin 42 is positioned in the first fully exposed hole, a spacer 63 (FIG. 2) of an elastic material, e.g. rubber, may be positioned between wheel 20a and sleeve 40 which can be compressed by sleeve 40 to expose the proper opening 34 in section 33 thereby firmly locking wheel 20a on the mount 10.

FIG. 4 discloses another embodiment of tire mount means 30. Tire mount means 30a (FIG. 4), while not adjustable to compensate for the width of the tire 20, can be used for most standard sized tires. Means 30a is comprised of base plate 27 identical to that of the above described embodiment. A first plate element 70 formed of a 6 inch length of 2 inch wide, ⅜ inch thick steel strap stock is welded to base plate 27. A second plate element 71 formed of a 6 inch length of the same material is pivotably mounted on base plate 27 by means of hinge 72 which is welded thereto at a position approximately 1½ inches above first plate element 70. Spacer 73 (a 2 inch length of the same material) is pivotably mounted at the forward end of plate element 71 by means of hinge 74 which is welded thereto.

In operation, means 30a will be locked in a desired vertical position on member 18 by set screw 61 similarly as described above. Spacer 73 is pushed inwardly to pivot about hinge 74 thereby allowing plate element 71 to pivot downwardly about hinge 72. The center opening 20b in wheel 20 is then positioned onto the collapsed means 30a. Spacer 73 is now moved outwardly to pivot to the position shown in FIG. 4. Lock 45 is placed through opening 76 in plate element 70 to prevent spacer 73 from being moved inwardly. The sloping surface formed by plate element 71 prevents removal of tire 20 from mount 10 until lock 45 is removed and the means 30a is again collapsed.

It can be seen from the above that the present invention provides a spare tire mount that is easily installed and removed from the bed of a typical pickup. When tire 20 is locked on mount 10, access to follower assembly (i.e. nut 50) and pin 35 is completely blocked by the tire and cannot be unthreaded. This prevents the unauthorized removal of either the tire or the mount by normal means.

What is claimed is:

1. A spare tire mount for a pickup truck comprising:
a main support structure comprising:
   a support member having an upper and lower plate affixed at either end thereof, said upper plate having an opening therethrough;
   a threaded member affixed to the upper side of said lower plate and extending upward therefrom;
   a follower assembly threadly positioned on said threaded member;
   an elongated latching element slidably positioned through said opening in said upper plate, said latching element having a lower end in contact with said follower assembly on said threaded member and an upper end adapted to engage the underside of upper sidewall portion of the load bed of a pickup truck when said spare tire mount is in an operable position; and
tire securing means comprising:
   a carriage slidably mounted on said main support means; and
   tire mounting means affixed to said carriage adapted to receive a spare tire.

2. The spare tire mount of claim 1 wherein said tire mounting means comprises:

a first sectional member secured to said carriage and extending outwardly substantially perpendicular thereto;
a second sectional member telescopically positioned on said first sectional member;
means for securing said first and second members together in a desired position relative to each other;
a sleeve adapted to be slidably positioned on said second sectional member; and
means for securing said sleeve on said second sectional member.

3. The spare tire mount of claim 2 wherein said means for securing said first and second sections together comprises:
a series of spaced openings in both said first and said second sectional members; and
a pin adapted to be received by aligned said openings in said first and second sectional members when said members are in said desired position.

4. The spare tire mount of claim 3 wherein said means for securing said sleeve comprises:
a pin adapted to be positioned in one of said openings in said second sectional member, said pin having an opening therethrough adapted to receive a lock.

5. The tire mount of claim 1 wherein said tire mounting means comprises:
a first plate element securely affixed to said carriage and extending outwardly substantially perpendicular thereto;
a second plate element pivotably mounted on said carriage a vertical distance above said first plate element;
a spacer element pivotally mounted near the front of and on the lower surface of said second plate element, said spacer element having a length greater than said vertical distance; and
an opening in said first plate element positioned to lie immediately behind said spacer when said spacer is pivoted into a vertical position in relation to said first plate member, said opening adapted to receive a lock.

6. The tire mount of claim 1 wherein said latching element comprises:
a tubular member slidably positioned through said opening in said upper plate and having its lower end positioned over said threaded member whereby its lower edge rests on said follower assembly; and
an element having a channel therein affixed to the upper end of said tubular member, said channel being adapted to receive a flange portion on the underside of the upper sidewall portion of the load bed of a pickup truck.

7. The spare time mount of claim 6 wherein said tire mounting means comprises:
a first sectional member secured to said carriage and extending outwardly substantially perpendicular thereto;
a second sectional member telescopically positioned on said first sectional member;
means for securing said first and second members together in a desired position relative to each other;
a sleeve adapted to be slidably positioned on said second sectional member; and
means for securing said sleeve on said second sectional member.

8. The spare tire mount of claim 7 wherein said means for securing said first and second sections together comprises:
a series of spaced openings in both said first and said second sectional members; and a pin adapted to be received by aligned said openings in said first and second sectional members when said members are in said desired position.

9. The spare tire mount of claim 8 wherein said means for securing said sleeve comprises:

a pin adapted to be positioned in one of said openings in said sectional member, said pin having an opening therethrough adapted to receive a lock.

10. A spare tire mount for a pickup truck comprising:
a main support structure comprising:
- a support member formed of a continuous length of steel strap stock;
- an upper plate formed of steel strap stock affixed to one end of said support member and extending substantially perpendicularly thereto, said upper plate having an opening therethrough;
- a lower plate formed of steel strap stock affixed to the other end of said support member and extending substantially perpendicular thereto in the same direction as said upper plate;
- a threaded member secured to the upper side of said lower plate and extending upwardly therefrom;
- a follower assembly threaded onto said threaded member;
- a tubular member slidably positioned through said opening in said upper plate and having its lower end positioned over said threaded member with its lower edge thereof resting on said follower assembly;
- an element having a channel therein affixed to the upper end of said tubular member, said channel being adapted to receive a flange portion on the underside of the upper sidewall portion of the load bed of a pickup truck; and tire securing means comprising:
- a carriage having a base plate; means to slidably mount said base plate on said support member;
- a set screw through said base plate adapted to engage said support member when threaded inwardly;
- a first sectional member secured to said base plate and extending outwardly substantially perpendicularly thereto;
- a second sectional member telescopically positioned on said first sectional member;
- means for securing said first and second members together in a desired position relative to each other;
- a sleeve adapted to be slidably positioned on said second sectional member; and
- means for securing said sleeve on said second sectional member.

* * * * *